United States Patent
Weiss

[11] 3,825,756
[45] July 23, 1974

[54] CALIBRATION DEVICE FOR A GAS ANALYZER

[75] Inventor: Morris Weiss, Pelham, N.Y.

[73] Assignee: Barnes Engineering Company, Stamford, Conn.

[22] Filed: May 3, 1973

[21] Appl. No.: 356,876

[52] U.S. Cl. .............................. 250/343, 250/351
[51] Int. Cl. ........................................... G01n 21/26
[58] Field of Search .......... 250/343, 344, 345, 346, 250/351, 373

[56] References Cited
UNITED STATES PATENTS

| | | | |
|---|---|---|---|
| 3,435,209 | 3/1969 | Keahl | 250/343 |
| 3,498,132 | 3/1970 | Smith | 250/343 |
| 3,678,262 | 7/1972 | Herrmann | 250/339 |

Primary Examiner—James W. Lawrence
Assistant Examiner—C. E. Church
Attorney, Agent, or Firm—Joseph Levinson; Robert Ames Norton

[57] ABSTRACT

A calibration device is provided for a gas analyzer which measures the amounts of a plurality of gases in a gas sample. A source of radiation is applied through a gas sample, and selectively applied to an infrared detector by a filter wheel which alternately applies radiation from an absorption region of the gas to be measured and from a transparent or reference wavelength. Filters for different absorption regions are used with the reference filter to detect the presence of different gases in the sample. A calibration device is inserted between the source and the infrared detector which attenuates radiation in the desired absorption regions while passing radiation in the reference region. The calibration device is comprised of a suitable infrared transmissive substrate, such as germanium, with different anti-reflective coatings on each side of the element to achieve the necessary attenuation for the measured wavelengths while passing radiation in the reference wavelength.

3 Claims, 3 Drawing Figures

PATENTED JUL 23 1974          3,825,756

CALIBRATION DEVICE FOR A GAS ANALYZER

BACKGROUND OF THE INVENTION

This invention relates to a calibration device for a gas analyzer, and more particularly to such a device which calibrates an instrument which measures the constituency of a plurality of gases simultaneously, and the calibration device provides calibration for the plurality of gases simultaneously.

In an application entitled "Infrared Two Gas Analyzer," Ser. No. 180,583, filed Sept. 15, 1971, now U.S. Pat. No. 3,735,127, which is assigned to the assignee of the present application, a radiation absorption gas analyzer is disclosed and described for the measurement of two gases in a gas sample being analyzed, which measurements may be made simultaneously. A source of infrared radiation is applied through a sample or absorption cell containing the gas to be measured, and through a rotating optical filter wheel onto an infrared detector. The filter wheel contains two analytic filters passing absorption regions of the gas desired to be measured, and two reference filters in two non-absorbing regions. The resulting detector signal contains the two gas signals with a 90° phase displacement. Two reference pickups are utilized which generate two signals as the filter wheel rotates which are out of phase with each other by 90°. The signals from the detector and from the reference pickups are fed to synchronous rectifiers or demodulators which reject signals 90° out of phase with the reference signal, thereby providing a rectified output representing the quantity of gas in the sample under test. Utilizing two channels and two meters, the two gas constituents in the gas sample are capable of being separated and monitored simultaneously. In this type of approach, and in others where two or more gases are being monitored simultaneously, which would be the case for example in the analysis of automotive exhaust gases, calibrating the instruments becomes a problem. Simply inserting an attenuation device, in the form of a wire or a grid, in the radiation path would affect all measurements equally, and simply desensitize but not calibrate the instrument. This is because the reference or transparent region, which is compared with an absorption region, utilizes the same radiation path. Accordingly, the insertion of an attenuation device in the absorption path would not work, because it would equally apply to the reference wavelength, and no calibration would be achieved.

Another method would be to insert in the sample cell a sample of the gas desired to be measured, and calibrate the meter used to indicate that gas. Of course, if a plurality of gases are being metered, each of the gases would have to be separately placed in the sample cell and the meter calibrated. This procedure is not only time-consuming, but requires the storing and use of a quantity of the gases to be measured.

Accordingly, it is an object of this invention to provide a simple approach for calibrating a gas analyzer for the measurement of a plurality of gas constituents.

A further object of this invention is to provide a new and improved calibration device for calibrating a gas analyzer for a plurality of gases simultaneously by merely inserting the calibration element into an optical beam of a gas analyzer instrument, either mechanically or automatically, and reading the output on the gas analyzer meters.

SUMMARY OF THE INVENTION

In carrying out this invention in one illustrative embodiment thereof, a calibration device in the form of an optical element having different anti-reflection coatings on each side of the element to achieve attenuation of radiation for at least two given wavelengths, and which passes radiation in a reference wavelength, is inserted between the source and an infrared detector of a gas analyzer.

DESCRIPTION OF THE PREFERRED EMBODIMENTS

The calibration device embodied in this invention is described for operation in a two-gas analyzer of the type disclosed in the aforesaid patent application, but as will be apparent hereinafter, may be utilized in other types of gas analyzers.

Figure 1:
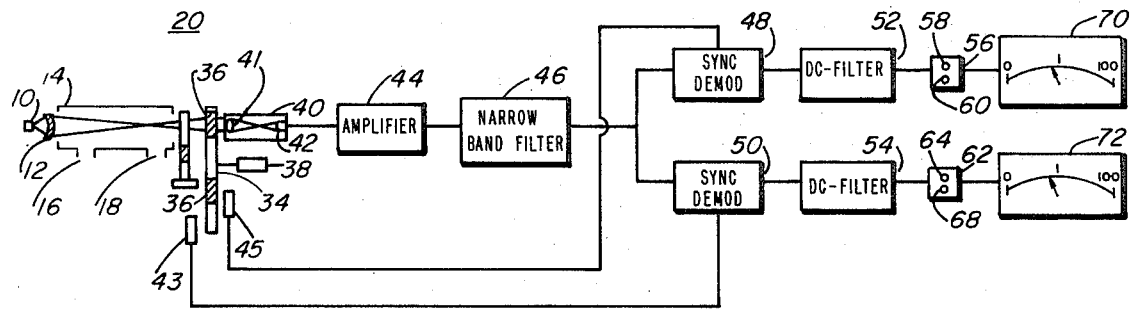
FIG. 1 is a schematic block diagram showing the use of the calibration device embodied in this invention in a two-gas analyzer.

Referring now to FIG. 1, a gas analyzer instrument is provided which has a source of radiation 10 and a condensing lens 12 for applying the radiation from the source 10 through a sample cell 14 having an inlet 16 and outlet 18. The sample cell is shown diagrammatically in FIG. 1, but it will be appreciated that it is sealed off with windows which are transparent to the radiation desired to be passed. Samples which are desired to be analyzed are inserted through the inlet 16 and removed from the sample cell through the outlet 18. A calibration device in accordance with this invention, generally referred to with the reference character 20, is shown placed between the sample cell 14 and a rotating filter wheel 34 which is driven by a motor 38. The placement of the calibration device 20 is not critical, but it must be positioned between the source and the detector so that calibration can be provided. Although not shown in detail, but in accordance with the aforesaid patent application, the filter wheel 34 is a four-position filter wheel having two analytic filters and two reference filters designated generally with the reference character 36, which are positioned in quadrature and accordingly have their center lines separated by 90°. For purposes of illustration, and considering the use of the invention adapted to testing of automotive exhaust emissions, one of the analytic filters may be for testing of hydrocarbons, and would be centered on the order of 3.4 microns, while the other analytic filter could be used for sensing carbon monoxide and would have a band pass centered at approximately 4.6 microns. The other two reference filters may be identical, and are selected to transmit in regions where neither of the gases to be tested absorb, for example, 4 microns. The rotating filter wheel 34 is provided with two reference generators or pickups 43 and 45, which may be photometric or magnetic, which generate two signals at the filter wheel rotation rate which are out of phase with each other by 90°.

Radiation from the source 10, after passing through the sample cell 14 and the rotating filter wheel 34, is applied to a detector assembly 40 through a lens 41 onto an infrared detector 42. The infrared detector should be capable of measuring radiation in the spectral regions where the gases which are to be detected have absorption bands. Although not limited thereto, thermistor bolometers have been found suitable for gas analysis application, due to their ruggedness and sensitivity over wide ranges in the infrared spectrum. The output of the detector 42 is coupled to an amplifier 44 and through a narrow bandpass filter 46 to synchronous demodulators or rectifiers 48 and 50. The synchronous demodulators 48 and 50 also have reference pick-ups 45 and 43 respectively coupled thereto. The output of demodulator 48 is fed through a DC filter 52, through a panel control unit 56 having a zero-adjust potentiometer 58 and a span-adjust potentiometer 60 thereon, to a panel meter 70. The output of synchronous demodulator 50 is fed through a DC filter 54, through a panel control unit 62 having a zero-adjust potentiometer 64 and a span-adjust potentiometer 68 and an output meter 72 coupled thereto.

The operation of the gas analyzer is the same as that shown and described in the aforesaid patent application. Briefly, using the chosen examples of carbon monoxide and hydrocarbon for the gases desired to be detected in the sample which is inserted in the sample cell 14, gas selection and discrimination is achieved in the instrument by using quadrature sampling. The rotating filter wheel 34 generates two signals at the detector 42 at the wheel rotation rate which are out of phase with each other by 90°. One is caused by CO and the other by HC absorption. The two reference pickups 43 and 45 produce reference signals which are also fed in phase quadrature. By processing the gas signal against the proper reference pickup signals in the synchronous demodulators 48 and 50, automatic separation and rejection of signals occur which, for example, produces a CO readout on meter 70 and an HC readout on meter 72. The signals on the meters 70 and 72 indicate the amount of gas in the sample being tested.

Figure 2:
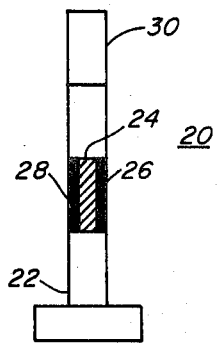
FIG. 2 shows a front elevation of the calibration device embodied in this invention, positioned in one form of holder therefor.
Figure 3:
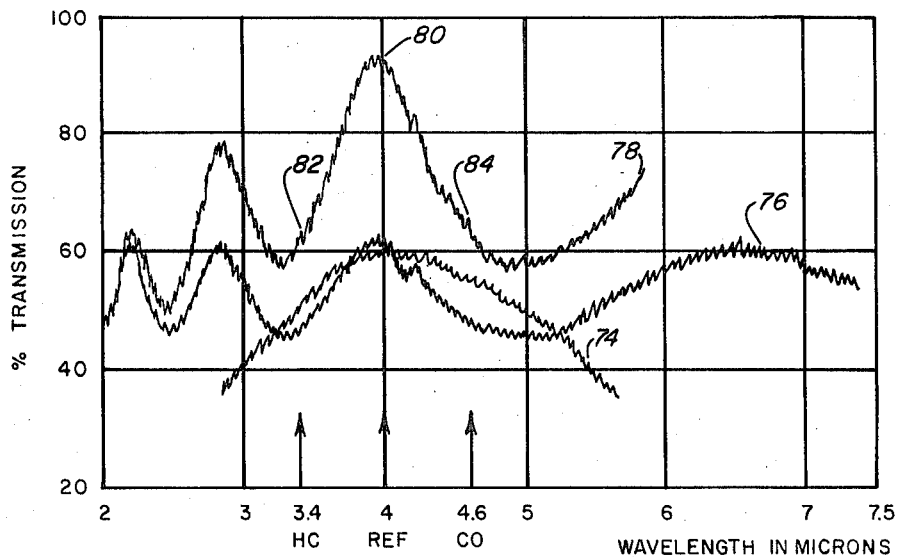
FIG. 3 shows a graph of transmission vs wavelengths illustrating the spectral characteristics of the calibration device embodied in this invention.

Instrument calibration is achieved in accordance with this invention with a calibration device 20 illustrated in FIG. 2. The calibration device 20 must have the characteristics of attenuating radiation in the absorption regions in which the measurement is desired, while transmitting radiation in any of the reference regions. In accordance with the present invention, this is achieved using a very simple approach in which a germanium element is provided with anti-reflection coatings 26 and 28, which pass radiation which is peaked at 4 microns and attenuate radiation at 4.6 and 3.4 microns, corresponding to the absorption regions of carbon monoxide and hydrocarbon, which in the example for illustrative purposes were desired to be measured in a gas sample. This was achieved with the calibration device 20 by putting different anti-reflection coatings 28 and 26 on each side of the element 24 for independently establishing the attenuation at 4.6 and 3.4 microns. In the illustrative example, one side of the element 24 is coated with an anti-reflection coating having a quarter-wavelength thickness at 20 microns and the other side a quarter-wavelength thickness at 4 microns. The spectral results of this are shown in FIG. 3, where curve 74 represents a quarter-wavelength anti-reflection coating at 4 microns while curve 76 represents a quarter-wavelength thick coating at 20 microns. The composite curve 78 represents both coatings, one on each side, showing almost 100 percent transmission at point 80 at the reference wavelength of 4 microns with considerable attenuation at point 82 at 3.4 microns representing the hydrocarbon, and considerable attenuation at point 84 at 4.6 microns representing the carbon monoxide wavelength.

Calibration of the instrument for both bases simultaneously is thus conveniently achieved by merely inserting the calibration element 24 into the optical beam of the instrument between the source 10 and the detector 42, either manually or automatically, and reading the output of the panel meters 70 and 72. As shown in FIG. 2, one form of inserting the calibration element 24 into the optical beam is by mounting it on a slide member 22 which may be slid into an open frame 30 which is positioned in the path of the optical beam with the slide being positioned in the frame by a stop 32 and held therein by any suitable detent means (not shown). It will be apparent that other forms of devices may be used for manually or automatically inserting the calibration device into the instrument.

As stated previously, calibration is obtained merely by inserting the calibration element into the path of the optical beam and adjusting the span-adjust potentiometers 60 and 68 in accordance with meter deflections on the meter panels 70 and 72, with the calibration. The calibration can be made periodically and the instrument panels adjusted for each calibration so that the needle deflecion is at the same point on the meter for each calibration. After the calibration has been set, degradation of the source, changes in temperature thereof, changes in atmospheric conditions, etc., will not affect the instrument readings, since it has been calibrated to handle such changes. It will be apparent that the calibration here used is particularly appropriate for simultaneously calibrating for a gas analyzer which simultaneously measures the amounts of at least two gases simultaneously. The calibration technique is, however, not restricted to instruments utilizing quadrature type detection systems, but may be also applied to any systems utilizing simultaneous samplings of a plurality of gases, for example ratio detection, and it may be used for more than two gases provided that the element attenuates in all of the absorption regions while transmitting in the reference regions of the filter wheel.

I claim:

1. A calibration device for a gas analyzer comprising a. a sample cell containing a sample of the gases to be analyzed,
b. an infrared detector,
c. a source of radiation directed through said sample cell and onto said infrared detector,
d. means for selectively applying radiation passed from said source through said sample cell onto said infrared detector for at least two absorption regions for gases to be measured and at least one reference region whereby signals are generated by said detector in accordance with the amount of radiation applied thereto in said regions, e. circuit means for processing said signals to measure the amounts of at least two gas constituents in said sample cell, and
f. a single calibration element for insertion between said source and said infrared detector having anti-reflection coatings on each side thereof for attenuating radiation in at least two absorption regions while transmitting radiation in said reference region.

2. The calibration device set forth in claim 1 wherein said single calibration element comprises an element of infrared transmissive material having anti-reflection coatings on each side thereof.

3. The calibration device set forth in claim 2 wherein said two absorption regions are 3.4 and 4.6 microns and said anti-reflection coatings are quarter-wavelength thick at 4 microns and quarter-wavelength thick at 20 microns.

* * * * *